United States Patent [19]

Brown

[11] 4,293,061
[45] Oct. 6, 1981

[54] REMOTE CONTROLLED HUB CLUTCH

[75] Inventor: Arthur K. Brown, South Bend, Ind.

[73] Assignee: The Bendix Corporation, Southfield, Mich.

[21] Appl. No.: 56,483

[22] Filed: Jul. 11, 1979

[51] Int. Cl.³ .......... F16D 1/06; F16D 11/00; F16D 25/061
[52] U.S. Cl. .............. 192/67 R; 192/85 A; 192/85 CA; 192/96
[58] Field of Search .......... 192/67 R, 85 A, 85 CA, 192/96, 49, 50; 403/1; 180/245, 247

[56] References Cited

U.S. PATENT DOCUMENTS

| 989,007 | 4/1911 | Hanson | 192/67 R X |
|---|---|---|---|
| 2,226,309 | 12/1940 | Gleasman | 192/85 CA |
| 2,345,410 | 3/1944 | Mierley | 192/85 A X |
| 2,428,336 | 9/1947 | Munschauer | 192/85 A |
| 2,609,243 | 9/1952 | Ponnequin | 301/1 |
| 2,684,140 | 7/1954 | Warn | 192/43 |
| 2,788,103 | 4/1957 | Requa | 192/67 R |
| 2,803,149 | 8/1957 | Pringle | 192/85 A |
| 2,844,238 | 7/1958 | Peterson | 192/67 R |
| 2,854,111 | 9/1958 | Simonsen | 192/71 |
| 2,874,814 | 2/1959 | Beck | 192/38 |
| 2,907,432 | 10/1959 | Strickland et al. | 192/71 |
| 2,948,557 | 8/1960 | Howe et al. | 287/53 |
| 2,978,276 | 4/1961 | Huffman | 301/1 |
| 3,017,207 | 1/1962 | Lloyd | 287/53 |
| 3,050,321 | 8/1962 | Howe et al. | 287/53 |
| 3,058,558 | 10/1962 | Hawk | 180/247 X |
| 3,123,169 | 3/1964 | Young et al. | 192/67 R X |
| 3,124,377 | 3/1964 | O'Brien et al. | 287/53 |
| 3,125,363 | 3/1964 | Kapusta | 287/53 |
| 3,184,258 | 5/1965 | Kapusta | 287/53 |
| 3,231,057 | 1/1966 | Wolf | 192/67 R |
| 3,251,630 | 5/1966 | Astley | 301/1 |
| 3,351,364 | 11/1967 | Warn et al. | 287/53 |
| 3,442,361 | 5/1969 | Hegar | 192/67 R |
| 3,541,888 | 11/1970 | Hegar et al. | 74/810 |
| 3,608,685 | 9/1971 | Childress | 192/94 |
| 3,637,243 | 1/1972 | Kitano et al. | 192/71 X |
| 3,656,598 | 4/1972 | Goble | 192/35 |
| 3,669,476 | 6/1972 | Wilson | 192/67 R X |
| 3,718,213 | 2/1973 | Hegar et al. | 192/67 R |
| 3,721,325 | 3/1973 | Richmond | 192/67 A |
| 3,753,479 | 8/1973 | Williams | 192/89 A |
| 3,972,633 | 8/1976 | Wright | 403/1 |
| 4,007,820 | 2/1977 | Kagata | 192/67 R |
| 4,019,586 | 4/1977 | Hauser | 192/48.91 |
| 4,213,514 | 7/1980 | Ehrlinger et al. | 180/247 X |
| 4,227,599 | 10/1980 | Ishiwata | 403/1 X |

Primary Examiner—Rodney H. Bonck
Attorney, Agent, or Firm—Terry L. Miller; Ken C. Decker

[57] ABSTRACT

A remotely controlled hub clutch assembly includes an axle member and a wheel hub member rotatably mounted on a vehicle housing member. A pair of relatively movable coupling portions provide an engageable and disengageable driving connection between the axle member and the wheel hub member. A mechanical or hydraulic actuation device connected to one of the coupling members moves the coupling members into coupling engagement in response to operator actuation of a control device located in the vehicle operator's compartment. Interconnecting structure operatively connects the actuation device to the control device. The interconnecting structure extends through the end of the axle, wheel hub or housing member near which that member is mounted and remote from the outboard end of the hub assembly. The hub clutch can be engaged or disengaged while the vehicle is at rest.

5 Claims, 6 Drawing Figures

REMOTE CONTROLLED HUB CLUTCH

BACKGROUND OF THE INVENTION

1. Field of the Invention

This invention relates to remotely controlled hub clutches for the front wheels of a four-wheel drive vehicle.

2. Description of the Prior Art

There are currently available a variety of manual and automatic hub clutch devices which operate to disengage and engage the front wheels from the front drive train of a four-wheel drive vehicle. To operate a typical manual hub clutch, the vehicle operator must manually turn the hubs at each front wheel to an engaged or disengaged position. However, to do this, the vehicle operator must leave the cab of the vehicle. The automatic free wheeling hub clutches are engaged or disengaged by over-running clutch arrangements which operate automatically in response to the relative rotation of portions of these clutch assemblies when the vehicle is in motion. Such automatic free wheeling hubs are not entirely reliable because they may inadvertently cut in or out of engagement at undesirable times under certain driving conditions such as loss of traction due to road conditions or when a wheel loses contact with the road surface. Such automatic hub clutches also tend to become noisy during operation as a result of wear.

SUMMARY OF THE INVENTION

It is an advantage of this invention in that a remotely controlled, positively acting hub clutch assembly is provided which can be engaged or disengaged by the vehicle operator from the operator's compartment.

It is also an advantage of this invention in that a hub clutch assembly is provided which can be positively engaged or disengaged while the vehicle is at rest.

It is a further advantage of this invention in that a hub clutch assembly is provided which will not inadvertently engage or disengage at undesired times due to driving conditions.

These advantages are achieved according to the present invention in that there is herein provided a hub clutch assembly with a pair of relatively movable coupling portions mounted on an axle and on a wheel hub to provide an engageable and disengageable driving connection between the axle and the wheel. One of the coupling portions is operatively connected to a control device located in the vehicle operator's compartment by connecting structure. The connecting structure may be carried by the axle member, by the wheel hub member or by the housing member upon which the axle and wheel hub are mounted. The connecting structure extends through the portion of one of these members about which that member is mounted relative to the other members. The connecting structure may consist of a mechanical linkage connected to a pull knob, or of a series of hydraulic fluid passages connected to a hydraulic control device.

DETAILED DESCRIPTION

Figure 1:
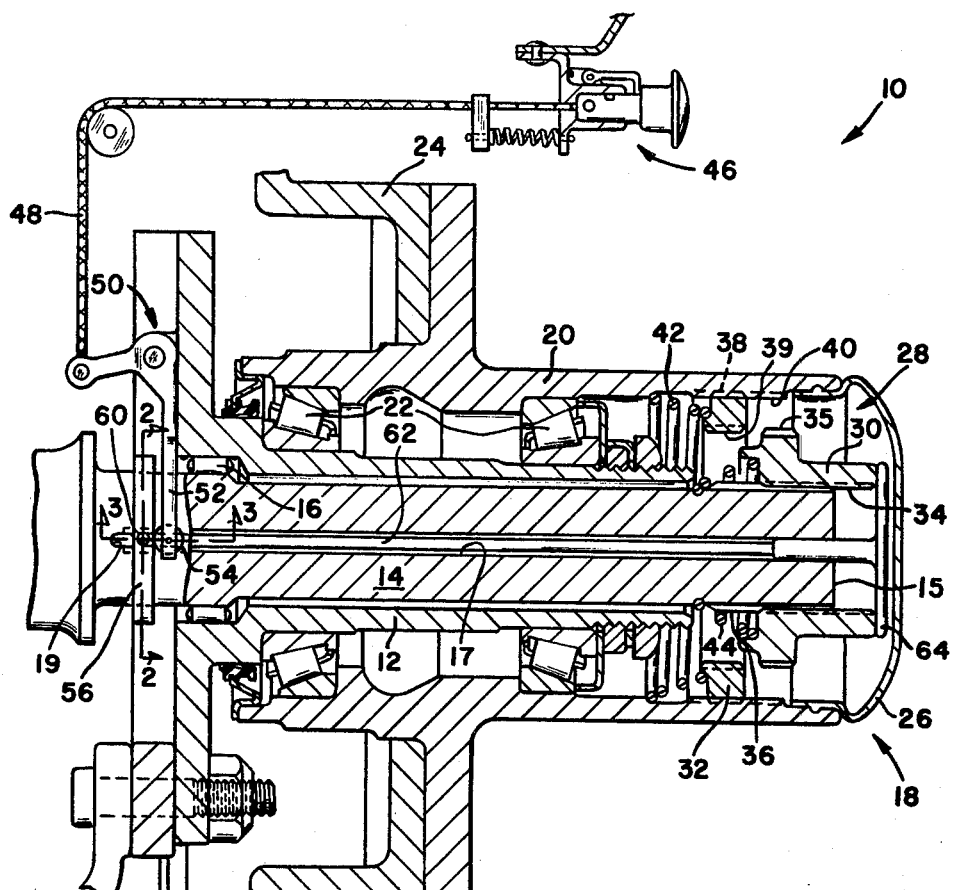
FIG. 1 is a sectional view of applicant's wheel hub assembly with remote control.
Figure 2:
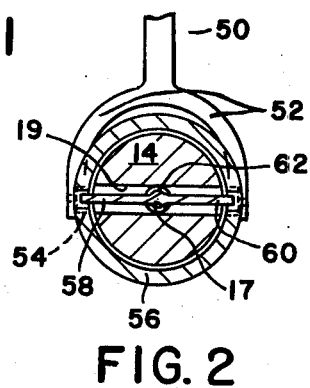
FIG. 2 is a sectional view in the direction of arrows 2—2 of FIG. 1.
Figure 3:
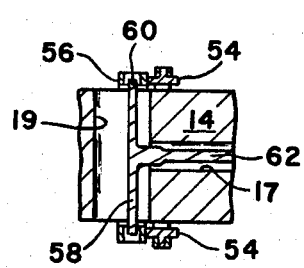
FIG. 3 is a sectional view in the direction of arrows 3—3 of FIG. 1.

Referring to FIGS. 1, 2, and 3, a vehicle hub assembly 10 includes a non-rotating housing 12 fixed relative to the vehicle (not shown). Axle member 14 is rotatably and coaxially mounted in the housing 12 by bearing 16. Bearing 16 is positioned on a portion of axle 14 remote from the exterior portion 18 of the hub assembly 10. Axle 14 includes an axial bore 17 which extends from the portion of axle 14 near bearing 16 to the end 15 of axle 14. Radial slot 19 extends through axle 14 from bore 17 to the surface of axle 14. Wheel support member or wheel hub member 20 is rotatably and coaxially mounted on housing 12 by bearings 22. Bearings 22 are generally positioned near a portion of wheel hub 20 remote from hub assembly exterior portion 18. Wheel hub 20 includes a tire mounting portion 24. Cap 26 fits onto wheel hub 20 to protect the interior of the hub assembly 10 from the environment.

An engageable and disengageable driving connection between axle 14 and wheel hub 20 is provided by clutch mechanism 28. Clutch mechanism 28 includes a pair of toothed coupling members 30, 32. Inner clutch member 30 includes internal splines 34 for matching engagement with external splines 36 on axle member 14 and coupling teeth 35 for coupling with outer coupling member 32. The splines 34, 36 are oriented to permit axial translation of the clutch member 30 with respect to axle member 14, but to prevent rotation of clutch member 30 relative to axle member 14. Outer clutch member 32 includes outer splines 38 for matching engagement with inner splines 40 of wheel hub 20 and coupling teeth 39 for coupling with coupling teeth 35 of inner coupling member 30. Splines 38, 40 are oriented to permit axial translation of outer clutch member 32 relative to wheel hub 20, however, the splines 38, 40 mate so that clutch member 32 rotates with wheel hub 20. A shock absorbing spring 42 is biased to urge clutch member 32 toward end 18 of hub assembly 10. Return spring 44 is biased to urge inner clutch member 30 away from outer clutch member 32 and out of coupling engagement therewith.

A control device or pull knob 46 is located in the vehicle cab or operator's compartment to provide for remote control of the clutch mechanism 28. Cable 48 connects control device 46 with a bell crank 50 pivotally mounted relative to housing 12. Bell crank 50 includes a pair of arms 52 which partially enclose axle member 14. Roller cams 54 are mounted at the ends of arms 52 for engaging an annular cam disc 56 coaxially mounted on axle member 14 adjacent bell crank arms 52. Cam disc 56 engages radial arms 58, 60 which extend through axle slot 19. Arms 58 and 60 are joined to one end of connecting rod 62, which is slidable axially in axle bore 17. The other end of connecting rod 62 extends beyond axle member 14 and terminates in coupling member 64 which engages inner clutch member 30. Roller cams 54 permit axle 14, rod 62, radial rams 58, 60 and cam disc 56 to rotate freely as a unit relative to bell crank 50. Cable 48, bell crank 52, cam disc 56, arms 58, 60, rod 62 and coupling member 64 comprise the mechanical linkage which connects control device 46 to clutch mechanism 28 and which permits remote control of the clutch mechanism 28. The mechanical linkage together with axle bore 17 and slot 19 comprise the interconnecting structure between the control device 46 and clutch mechanism 28.

Figure 4:
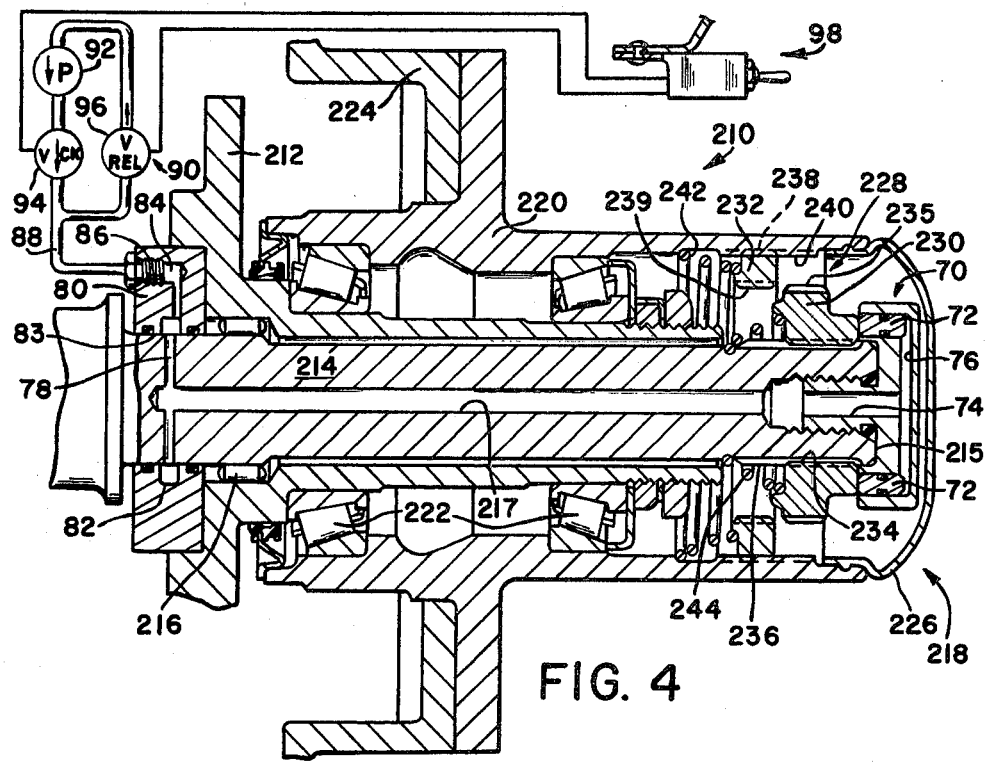
FIGS. 4, 5, and 6 are sectional views of alternative embodiments of applicant's hub assembly.
Figure 5:
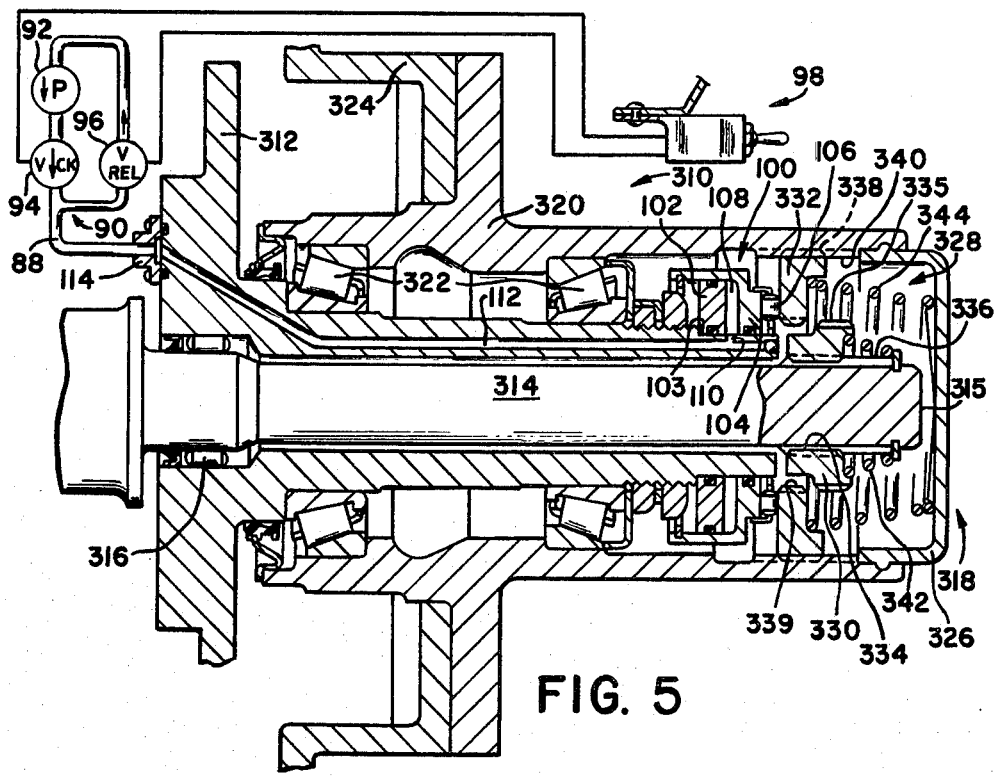
Figure 6:
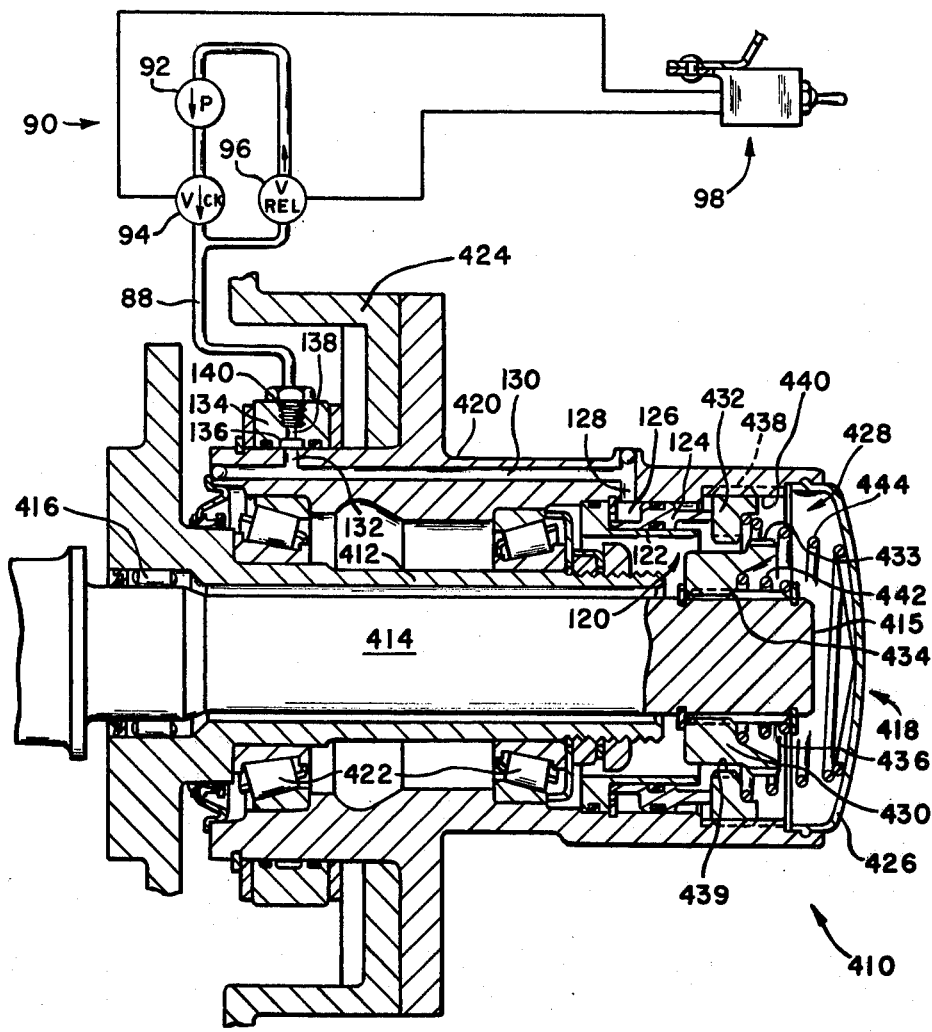

Three alternate embodiments of applicant's hub clutch assembly utilizing hydraulic, rather than mechanical linkages, are illustrated in FIGS. 4, 5, and 6. Reference numerals for parts similar to those illustrated in FIGS. 1-3 are obtained by adding 200, 300, and 400 to the reference numerals of FIGS. 1-3.

Hub assembly 210 of FIG. 4 includes a hydraulic hub clutch actuation device 70 sealingly and coaxially mounted at the outwardly facing end 215 of axle member 214. Actuation device 70 includes at least one pressure piston 72 mounted so as to be capable of operatively engaging inner clutch member 230. Passages 74, 76 communicate axle bore 217 with pressure pistons 72. Radial passages 78 near the other end of axle 214 communicate axle bore 217 with the surface of axle 214.

Hub assembly 210 also includes a slip ring 80 fixed relative to the vehicle, and sealingly and coaxially mounted on the axle member 214 so that slip ring 80 seals around radial axle passages 78. Slip ring 80 includes an annular groove 82 on its inner circumferential surface 83 adjacent axle member 214. Radial passages 78 and annular groove 82 cooperate so that they communicate with each other at all times, independent of the angular position or rotation of axle member 214 relative to slip ring 80. Slip ring 80 also includes passage 84 which communicates annular groove 82 with fluid pressure inlet 86 to which hydraulic line 88 may be attached. Hydraulic line 88 communicates inlet 86 with hydraulic control apparatus 90. Hydraulic control apparatus 90 includes pressure source 92, solenoid check valve 94, solenoid relief valve 96 and a remote operator actuated control switch 98. Pressure source 92 may consist of a vehicle power steering pump, or any auxiliary source of hydraulic pressure, such as an accumulator in conjunction with a hydraulic pump. Control switch 98 may be positioned in the vehicle cab or operator's compartment, and is operatively connected to valves 94 and 96. Hydraulic line 88, slip ring 80, passages 78, 217, and hydraulic actuator 70 comprise the interconnecting structure which provides for remote control of clutch mechanism 228 by control apparatus 90 in the embodiment 210 illustrated in FIG. 4.

The hub assembly 310 illustrated in FIG. 5 includes a hydraulic actuator 100 with a support member 102 coaxially and sealingly mounted on the outer circumferential surface 103 of housing member 312. Actuator 100 also includes a flanged cylindrical piston 104 coaxially, sealingly, and axially slidably mounted on housing 312. Pressure chamber 108 is communicated with hydraulic line 88 and hydraulic control apparatus 90 via orifice 110, passage 112 and inlet 114 in housing 312. Hydraulic line 88, passage 112, orifice 110 and hydraulic actuator 100 comprise the interconnecting structure which provides for remote control of clutch mechanism 328 by control apparatus 90 in the embodiment illustrated in FIG. 5.

Hub assembly 410 illustrated in FIG. 6 includes hydraulic actuator 120 mounted on the inner circumferential surface of wheel hub member 420. Actuator 120 includes a cylindrical flanged housing portion 122 fixed sealingly on the inner circumferential surface of wheel hub 420. Actuator 120 also includes cylindrical piston member 124 which is slidably and sealingly mounted between the hub 420 and the housing portion 122 for operative engagement with outer clutch member 432. Housing portion 122, piston 124 and wheel hub 420 cooperate to define pressure chamber 126. Pressure chamber 126 is communicated to an outer circumferential surface of wheel hub 420, near a portion of wheel hub 420 remote from end 415 of axle 414, via wheel hub passages 128, 130 and 132. Hub assembly 410 also includes a slip ring 134 fixed relative to the vehicle, and sealingly and coaxially mounted on the wheel hub 420 so that slip ring 134 seals around wheel hub passage 132. Slip ring 134 includes an annular groove 136 on its inner circumferential surface adjacent wheel hub 420. Passage 132 and groove 136 cooperate so that communication between them is never interrupted, regardless of the angular position or rotation of wheel hub 420 relative to slip ring 134. Slip ring 134 also includes passage 138 which communicates annular groove 136 with inlet 140, to which hydraulic line 88 may be attached. Hydraulic line 88, slip ring 134, passages 132, 130 and 128, and hydraulic actuator 120 comprise the interconnecting structure which provides for remote control of clutch mechanism 428 by control apparatus 90 in the embodiment illustrated in FIG. 6.

MODE OF OPERATION OF THE FIRST EMBODIMENT

The embodiment illustrated in FIGS. 1-3 operates as follows: First, assume the vehicle (not shown) is at rest and the transfer case (not shown) is shifted so that the vehicle is in the two-wheel drive mode. In this situation, the front drive shaft (not shown) and the front axle, including axle member 14 are disengaged from the transmission (not shown). The hub assembly illustrated in FIGS. 1-3, one of which is associated with each of the front wheels (not shown) is in the state shown in FIG. 1 with clutch member 30 disengaged from clutch member 32 by return spring 44. If the vehicle were to move in this condition, the wheel hub 22 would freely rotate on housing 12. But since clutch mechanism 28 is disengaged, axle member 14 would not be forced to rotate with wheel hub 20. Thus, axle member 14, bearings 16, the front differential gear (not shown), and the front drive shaft would not be subject to wear.

The vehicle may be shifted from the two-wheel drive mode to the four-wheel drive mode while at rest by shifting the transfer case to fourwheel drive and by engaging clutch mechanism 28. Shifting the transfer case to fourwheel drive engages the front wheel drive shaft, as well as the rear drive shaft, with the vehicle transmission. Engaging clutch mechanism 28 couples wheel hub 20 to the front drive shaft through axle member 14 and the front differential gear.

The hub clutch mechanism 28 is engagable by the vehicle operator remote from the hub assembly 10 in the cab or operator's compartment, by means of the control device or knob 46, which can be located on the vehicle dashboard. When it is desired to engage clutch mechanism 28, the operator pulls on the knob of control 46. This movement causes cable 48 to pivot bell crank 50 clockwise when viewed as in FIG. 1. This causes bell crank arms 52 and cam disc 56, which is engaged by roller cams 54, to shift axially to the left. Because rod 62 is coupled to cam disc 56 by radial arms 58 and 60, both rod 62 and rod arms 58 and 60 shift axially within axle bore 17 and axle slot 19. Coupling member 64, fixed to the end of rod 62, engages and moves inner coupling member 30 axially relative to axle member 14 and toward outer coupling member 32. Coupling member 30 moves against return spring 44 until teeth 33 and 39 of inner and outer coupling members 30 and 32 are in coupling engagement. If the coupling members 30 and 32 are misaligned, spring 42 allows coupling member 32 to move with coupling member 30, and absorbs the shock of their engagement until they can be properly aligned for coupling engagement. With members 30 and 32 coupled together, the hub mechanism 28 is engaged and the vehicle is in the four-wheel drive mode. In this mode wheel hub 20 is forced to rotate along with axle member 14 so that torque can be transmitted from the rear drive shaft to the front wheels via axle member 14 and clutch mechanism 28. Control knob 46 includes a latching feature which permits the knob to be latched in a position which holds the clutch mechanism 28 engaged until the knob is unlatched by the operator.

The hub mechanism 10 can be changed back to the two-wheel drive mode when the vehicle is at rest by disengaging clutch mechanism 28 and by shifting the transfer case to the two-wheel drive mode. Hub clutch mechanism 28 is disengaged by unlatching and releasing control knob 46 to allow it to return to its original position illustrated in FIG. 1. Return spring 44 then forces inner coupling member 30 axially away from and out of coupling engagement with outer coupling member 32 so that axle member 14 is disengaged from wheel hub 20. Thus, cable 48, bell crank 50, rod 62, coupling member 64 and inner coupling member 30 return to the position illustrated in FIG. 1 when clutch mechanism 28 is disengaged. If the vehicle is driven in the two-wheel drive mode, the wheel hub 20 will again be free to rotate without causing the rotation of the front axle member 14, the front differential gear and front drive shaft. It should be noted that this hub assembly and interconnecting structure permits the vehicle operator to disengage the hub clutch mechanism 28 by remote control from the vehicle cab while the vehicle is at rest.

MODE OF OPERATION OF ALTERNATE EMBODIMENTS

The alternate embodiments illustrated in FIGS. 4, 5, and 6 utilize hydraulic controls and connections, rather than mechanical linkages, to provide for remote control of the clutch mechanisms 228, 328, and 428 with the vehicle at rest. In each of these alternate embodiments fluid pressure from pressure source 92 is either communicated to or released from hydraulic line 88 by means of check valve 94 and relief valve 96 which are controlled by control device 98. Control device 98 is operable by the vehicle operator in the vehicle operator's compartment. When it is desired to engage clutch mechanisms 228, 328, or 428, the operator actuates control device 98 which causes relief valve 96 to close. Check valve 94 then permits fluid pressure to build up in hydraulic line 88. When it is desired to disengage the clutch mechanisms, the operator-actuated control device causes relief valve 96 to open and fluid pressure is released from hydraulic line 88.

Turning now to FIG. 4 in particular, when relief valve 96 closes, fluid pressure is communicated through hydraulic line 88 to inlet 86, passage 84 and annular groove 82 of slip ring 80. From there, the fluid pressure is communicated through radial bores 78 and axial bore 217 of axle member 214 to hydraulic actuator 70, whereupon the fluid pressure is communicated via passages 74 and 76 to pressure pistons 72. Pressure pistons 72 respond to the fluid pressure to move inner clutch member 230 axially along axle member 214 against the force of return spring 244 toward and into coupling engagement with outer coupling member 232. Torque may then be transmitted from axle member 214 through the engaged clutch mechanism 228 to wheel hub 220.

Check valve 94 and the closed relief valve 96 cooperate to maintain fluid pressure in the system and to maintain the clutch mechanism in the engaged position until relief valve 96 is opened by the operator.

To disengage clutch mechanism 228, the operator actuates control switch 98 in the vehicle cab to open relief valve 96. This releases the fluid pressure in the system and permits return spring 244 to move and uncouple inner coupling member 230 from outer coupling member 232. When the teeth 233 of inner coupling member 230 are completely disengaged from the teeth 239 of outer coupling member 232, clutch mechanism 228 is disengaged and the wheel hub 220 may rotate without causing rotation of axle member 214, front differential gear and front drive shaft.

The embodiments illustrated in FIGS. 5 and 6 operate in essentially the same manner as the embodiment of FIG. 4, the differences being the location of the fluid passages and the configuration and operation of the hydraulic actuator 328 and 428. In FIG. 5, fluid pressure is communicated from hydraulic line 88 to pressure chamber 108 via passages 112, 110 in housing member 312. The fluid pressure in chamber 108 moves piston 104 axially along the surface of housing member 312 until bearing 106 engages outer clutch member 332. Then the fluid pressure moves outer clutch member 332 toward and into coupling engagement with inner clutch member 330 to engage clutch mechanism 328. When the fluid pressure is released, return spring 344 axially moves outer coupling member 332 out of coupling engagement with inner coupling member 330 to disengage clutch mechanism 328.

In FIG. 6, fluid pressure is communicated from line 88 to pressure chamber 126 via slip ring 134 and passages 132, 130 and 128 of wheel hub member 420. The fluid pressure in chamber 126 moves piston 124 and outer clutch member 432 into coupling engagement with inner clutch member 430 to engage clutch mechanism 428. When the fluid pressure is released, return spring 444 moves outer clutch member 432 away from and out of coupling engagement with inner coupling member 330 to disengage clutch mechanism 428.

I claim:
1. In a vehicle:
   wheel support means rotatably mounted on said vehicle;
   an axle assembly rotatably mounted on said vehicle for transmitting torque to said wheel support means;
   clutch means interconnecting said wheel support means and said axle for engaging and disengaging said wheel support means with said axle;
   control means remote from said wheel support means for engaging or disengaging said clutch means when the vehicle is stationary, said control means including operator actuated means in an operator's compartment in the vehicle;
   structure interconnecting said operator-actuated means and said clutch means to engage and disengage the latter from said operator's compartment by operation of said operator-actuated means;
   said axle assembly defining a bore therewithin, said bore comprising a portion of said interconnecting structure, said interconnecting structure further comprising a mechanical linkage,
   said mechanical linkage comprising a rod slidable within said bore in response to actuation of said operator-actuated means, one end of said rod hav- ing a portion operatively engageable with said clutch means;

said axle assembly defining a slot extending from said bore to a surface of said axle assembly;

said mechanical linkage further comprising an arm connected to said rod and extending through said slot, a bell crank with an arm pivotal in response to actuation of said operator-actuated means, and a ring coaxially mounted on said axle assembly and engageable with said arms, at least one of said arms including roller cams to permit rotation of said rod and of said axle assembly relative to said bell crank, said bell crank arm pivoting in response to actuation of said operator-actuated means to translate said ring and said rod to engage and disengage said clutch means.

2. A hub assembly for mounting a vehicle wheel on a vehicle and for providing an engageable and disengageable driving connection to said wheel, said hub assembly comprising:

a housing member having a pair of ends;

an axle member having a pair of ends, one end of said axle member including means for rotatably mounting said axle member at one end of said housing member;

a wheel supporting member having a pair of ends, one end of said wheel supporting member including means for rotatably mounting said wheel supporting member at said one end of said housing member;

a clutch mechanism interconnecting said axle member and said wheel supporting member, said clutch mechanism including a pair of relatively movable portions mounted on said axle member and on said wheel supporting member;

interconnecting structure carried by one of said members and extending through said one end thereof, control of said clutch mechanism being provided through said interconnecting structure;

said interconnecting structure including means for connecting said clutch mechanism with an operator-actuated control device located in an operator's compartment of the vehicle to provide for remote control of said clutch mechanism when the vehicle is stationary;

one of said pair of relatively movable portions of said clutch mechanism moving in response to fluid pressure controlled by said control device to couple with said other movable portion to engage said clutch mechanism;

resilient means biasing said movable portions to uncouple and disengage said clutch mechanism in the absence of said fluid pressure;

said interconnecting structure comprising passage means defined by said housing member for communicating said fluid pressure with said one movable portion of said clutch mechanism.

3. A hub assembly for mounting a vehicle wheel on a vehicle and for providing an engageable and disengageable driving connection to said wheel, said hub assembly comprising:

a housing member having a pair of ends;

an axle member having a pair of ends, one end of said axle member including means for rotatably mounting said axle member at one end of said housing member;

a wheel supporting member having a pair of ends, one end of said wheel supporting member including means for rotatably mounting said wheel supporting member at said one end of said housing member;

a clutch mechanism interconnecting said axle member and said wheel supporting member, said clutch mechanism including a pair of relatively movable portions mounted on said axle member and on said wheel supporting member;

interconnecting structure carried by one of said members and extending through said one end thereof, control of said clutch mechanism being provided through said interconnecting structure;

said interconnecting structure including means for connecting said clutch mechanism with an operator-actuated control device located in an operator's compartment of the vehicle to provide for remote control of said clutch mechanism when the vehicle is stationary;

one of said pair of relatively movable portions of said clutch mechanism moving in response to fluid pressure controlled by said control device to couple with said other movable portion to engage said clutch mechanism;

resilient means biasing said movable portions to uncouple and disengage said clutch mechanism in the absence of said fluid pressure;

said interconnecting structure comprising passage means defined by said wheel supporting member for communicating said fluid pressure with said one movable portion of said clutch mechanism.

4. The hub assembly of claim 3, wherein:

said interconnecting structure further comprises a non-rotating slip ring coaxially mounted on said one end of said wheel supporting member, said slip ring including means for communicating said fluid pressure with said wheel supporting member passage means.

5. A hub assembly for mounting a vehicle wheel on a vehicle and for providing an engageable and disengageable driving connection to said wheel, said hub assembly comprising:

a housing member having a pair of ends;

an axle member having a pair of ends, one end of said axle member including means for rotatably mounting said axle member at one end of said housing member;

a wheel supporting member having a pair of ends, one end of said wheel supporting member including means for rotatably mounting said wheel supporting member at said one end of said housing member;

a clutch mechanism interconnecting said axle member and said wheel supporting member, said clutch mechanism including a pair of relatively movable portions mounted on said axle member and on said wheel supporting member;

interconnecting structure carried by one of said members and extending through said one end thereof, control of said clutch mechanism being provided through said interconnecting structure;

said interconnecting structure including means for connecting said clutch mechanism with an operator-actuated control device located in an operator's compartment of the vehicle to provide for remote control of said clutch mechanism when the vehicle is stationary;

said interconnecting structure comprising a mechanical linkage for connecting said clutch mechanism with said operator-actuated control device;

one of said pair of relatively movable portions of said clutch mechanism moving in response to movement of said mechanical linkage to couple with said other movable portion to engage said clutch mechanism, resilient means biasing said movable portions to uncouple and disengage said clutch mechanism, said axle member defining a bore therein, a rod comprising a portion of said linkage slidable within said bore in response to actuation of said operator-actuated control device, one end of said rod being operatively engageable with said one movable portion of said clutch mechanism;

said axle member defining a slot extending from said bore to a surface of said axle member, said interconnecting structure further comprising an arm connected to said rod and extending from said slot, a bell crank with an arm pivotal in response to actuation of said operator-actuated control device, and a ring coaxially mounted on said axle member and engageable with said arms, at least one of said arms including roller cams for allowing rotation of said rod and said axle member relative to said bell crank, said bell crank arm pivoting to translate said ring and said rod to engage and disengage said clutch mechanism.

* * * * *